United States Patent Office 3,826,802
Patented July 30, 1974

3,826,802
4'-DEOXYAMBUTYROSIN A AND B
Hiroshi Kawaguchi, Tokyo, Kei-Ichi Fujisawa, Kamifuku-oka, Hiroshi Tsukiura, Tokyo, and Masataka Konishi, Yokohama, Japan, assignors to Bristol-Myers Company, New York, N.Y.
No Drawing. Filed Sept. 13, 1972, Ser. No. 288,623
Int. Cl. A61k 21/00; C07c 129/18
U.S. Cl. 260—210 AB                          12 Claims

ABSTRACT OF THE DISCLOSURE

An antibiotic complex designated Bu–1975 is fermented from three subspecies of the microorganism named *Bacillus circulans*. The antibiotic complex is comprised of ambutyrosin A, ambutyrosin B, 4'-deoxyambutyrosin A, 4'-deoxybutyrosin B and a peptide-like fraction designated B.

BACKGROUND OF THE INVENTION

1. Field of the Invention

The antibiotic fractions 4'-deoxyambutyrosin A ($C_1$) and 4'-deoxyambutyrosin B ($C_2$) are new and novel compounds.

2. Description of the Prior Art

The most pertinent prior art is U.S. Pat. No. 3,541,078 which discloses and claims the products generically known as ambutyrosin A and B.

SUMMARY OF THE INVENTION

Antibiotic complex Bu–1975, is fermented from *Bacillus circulans* subsp. n. *croceus*, *Bacillus circulans* subsp. n. *proteophilus*, or *Bacillus circulans* subsp. n. *biotinicus*. The two novel components of the complex claimed herein are 4'-deoxyambutyrosin A ($C_1$) having the formula

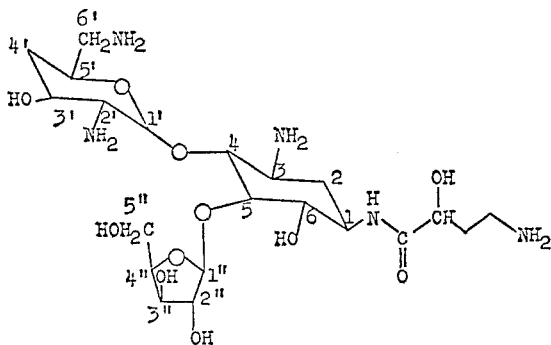

and 4'-deoxyambutyrosin B ($C_2$) having the formula

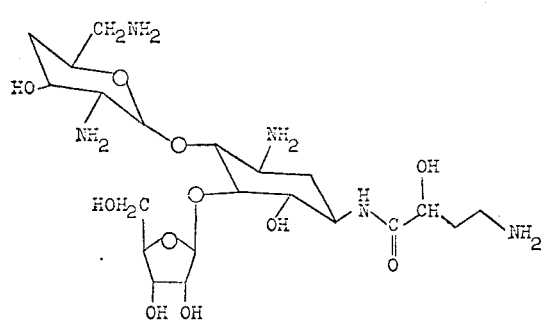

Component $C_1$ is chemically known as $N^1$-(4-amino-2-hydroxybutyryl)-4-O-(2,6 - diamino - 2,4,6 - trideoxy-D-glucopyranosyl)-5-O-D-xylofuranosyl - 2 - deoxystreptamine.

Component $C_2$ is chemically known as $N^1$-(4-amino-2-hydroxybutyryl)-4-O-(2,6 - diamino - 2,4,6 - trideoxy-D-glucopyranosyl)-5-O-D-ribofuranosyl - 2 - deoxystreptamine.

COMPLETE DISCLOSURE

This invention relates to a new and novel antibiotic complex called Bu–1975 and to two novel components isolatable therefrom. The antibiotic complex, Bu–1975, has been isolated from the fermentation broth of three strains of *Bacillus circulans*, designated as Strain Nos. C308–B4, C436–B1 and C532–B2 in the Bristol-Banyu culture collection. The antibiotic is a complex of at least five bioactive components, $A_1$, $A_2$, B, $C_1$ and $C_2$. Components $A_1$ and $A_2$ were identified with ambutyrosins A and B [U.S. Pat. No. 3,541,078 and Tetrahedron Letters, 28, pp. 2625–2628 (1971)] respectively and component B was a solvent-extractable antibiotic with peptide-like properties.

Components $C_1$ and $C_2$ are new aminoglycoside antibiotics. $C_1$ was found to be composed of D-xylose, 2-deoxystyreptamine, L-(—)-γ-amino - α - hydroxybutyric acid and 2,6-diamino-2,4,6-trideoxy-D-glucose, a new deoxy amino sugar, and has been determined to be 4'-deoxy-ambutyrosin A which has the structure

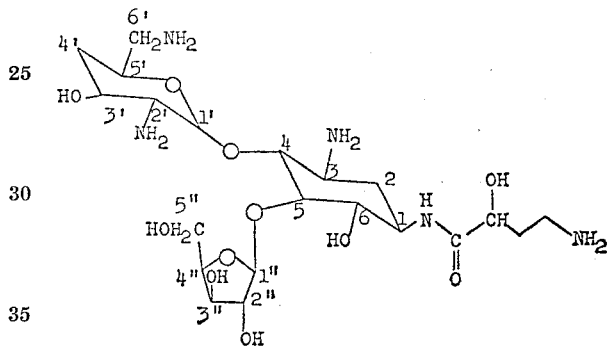

$C_2$ was found to be composed of D-ribose, 2-deoxystreptamine, L-(—)-γ-amino -α - hydroxybutyric acid and 2,6-diamino-2,4,6-trideoxy-D-glucose and hence it is 4'-deoxyambutyrosin B which has the structure

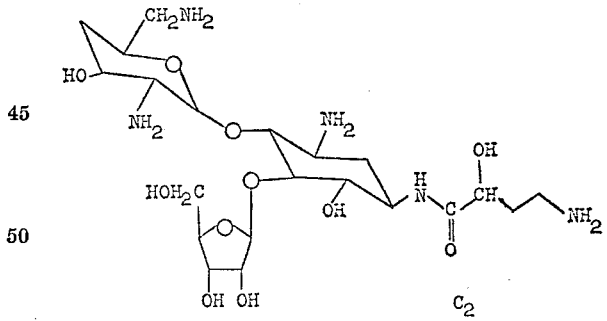

Components $C_1$ and $C_2$ exhibit broader spectrum of antibacterial activity than kanamycin and ambutyrosin, both inhibiting some kanamycin and/or ambutyrosin-resistant organisms.

The complex is fermented from either of three subspecies of the microorganism *Bacillus circulans*.

A culture of each of the livng organisms has been deposited in the American Type Culture Collection, 12301 Parklawn Drive, Rockville, Md. 20852 and have been assigned the following names and catalog numbers:

*Bacillus circulans* subsp. n. *croceus* (Strain No. C308–B4) A.T.C.C. *21820*.

*Bacillus circulans* subsp. n. *proteophilus* (Strain No. C436–B1) A.T.C.C. *21821*.

*Bacillus circulans* subsp. n. *biotinicus* (Strain No. C532–B2 (A.T.C.C. *21822*.

The morphological and cultural characteristics of these strains are shown in Table 1. The physiological reactions and carbon sources utilization of the strains are shown in Tables 2 and 3, respectively.

In view of the morphological, cultural and physiological characteristics described in these tables, all of the

TABLE 1

[Morphological and cultural characteristics of Bu-1975 producing organisms]

| | C308–B4 | C436–B1 | C532–B2 |
|---|---|---|---|
| Vegetative cells | Rods, 0.4 to 0.6 by 1.5 to 4.0 microns, with ends rounded, not in chains. Some palisade arrangement. Gram-variable, mostly negative. | Rods, 0.6 to 0.8 by 2.0 to 6.0 microns, with ends rounded, not in chains. Gram-variable, mostly negative. | Rods, 0.4 to 0.6 by 1.0 to 5.0 microns, with ends rounded, not in chains. Gram-variable, mostly negative. |
| Spores | Oval to ellipsoidal, 0.9 to 1.4 by 1.4 to 2.2 microns; terminal to sub-terminal, spore-wall thick and easily stained. | Oval to ellipsoidal, 0.9 to 1.2 by 1.3 to 2.2 microns; paracentral to terminal, spore-wall thick and easily stained. | Oval to ellipsoidal, 1.0 to 1.4 by 1.5 to 2.4 microns; terminal, spore-wall thick and easily stained. |
| Sporangia | Definitely swollen and racket-shaped. | Definitely swollen and spindle to racket-shaped. | Definitely swollen and racket-shaped. |
| Motility | Motile cell not found. | Motile. | Motile. |
| Nutrient agar slant | Growth abundant, thick, opaque, smooth, viscous and creamy becoming pale-orange with age. | Growth late, moderate, thin, opaque, smooth, viscous and creamy. | Growth abundant, thick, opaque, smooth, slightly viscous and whitish. |
| Glucose asparagine agar slant. | Moderate growth. Raised, semi-translucent, smooth, glistening, wrinkled, viscid and slight-yellow. | Scant growth, thin, translucent, smooth, viscid and colorless. | No or scant growth. |
| Glucose broth | pH 5.3–5.0 (37°C.). Lightly viscous pellicle or ring growth. Produced turbidity and sediment. | pH 7.5–8.0 (28° C.). Viscous pellicle. Light turbidity and sediment. | pH 6.8–5.8 (37° C.). No pellicle. Light turbidity and heavy sediment. Glucose broth plus biotine: pH 8.0–9.0. Complete pellicle. Turbidity and light sediment. |
| Colony on nutrient agar | Circular, raised to domed with entire margin. Opaque with smooth and glistening surface. Size: 1.0–3.5 mm. (in dia.). Viscous and pale-orange. No satellite colony. | Circular or slightly irregular, raised with irregular margin. Opaque with smooth surface. Size: 1.0–4.0 mm. (in dia.). Viscous and creamy. No satellite colony. | Flat to a little raised with slightly irregular margin. Opaque with smooth surface. Size 0.8–4.0 mm. (in dia.). Slightly viscous and creamy white. No satellite colony. |
| Growth temperature: | | | |
| Optimum | 37° C | 30° C | 45° C. |
| Moderate growth | 28–45° C | 22–37° C | 28–50° C. |
| Restricted growth | 20° C., 48° C | 20° C., 40° C | 25° C., 53° C. |
| Scant growth | 18° C., 50° C | 18° C., 42° C | 20° C., 55° C. |
| No growth | 15° C., 53° C | 12° C., 45° C | 15° C., 58° C. |
| Oxygen demand | Aerobic | Aerobic | Aerobic. |
| NaCl broth: | | | |
| Growth | 0–1% NaCl | 0–3% NaCl | 0–2% NaCl. |
| No growth | 2% NaCl | 4% NaCl | 3% NaCl. |
| Milk | Viscous, thick pale orange pellicle with viscous sediment. No other change. | Viscous, thick pellicle with viscous sediment. No other change. | Viscous, thick, faint-orange pellicle with scant sediment. Coagulated without peptonization. pH slightly alkalized. |
| Gelatin stab | Viscid, pale-orange pellicle. Liquefied gelatin completely after one week. | Viscid, creamy pellicle. Liquefied gelatin completely after one week. | Viscid, whitish pellicle. Liquefied gelatin completely after one week. |
| Growth factor | Nicotinic acid, biotine and complex of amino acids are accelerative for growth. | Nicotinic acid, biotine and complex of amino acids are accelerative for growth. | Biotine is essential for growth. |

TABLE 2

[Physiological reactions]

| Test | C308–B4 | C436–B1 | C532–B2 |
|---|---|---|---|
| Gas from carbohydrates | Negative | Negative | Negative. |
| Gelatin liquefaction | Positive (strong) | Positive (strong) | Positive (strong). |
| Indole production | Negative | Negative | Negative. |
| Starch hydrolysis | Positive | Positive | Positive. |
| (Iodine reaction's color) | (Orange yellow) | (Orange yellow) | (Orange yellow). |
| Citrate utilization | Negative | Negative | Negative. |
| Nitrate from nitrate | Positive | Positive | Positive. |
| Urease reaction | Negative | Negative | Negative. |
| Catalase reaction | Positive | Positive | Positive. |
| Oxidase reaction | Negative | Negative | Negative. |

TABLE 3

[Acid production from carbohydrates]

| | C308, B4 | | | C436, B1 | | | C532, B2 | | |
|---|---|---|---|---|---|---|---|---|---|
| | I[1] | II[2] | III[3] | I | II | III | I | II | III |
| Glycerol | + | + | ++ | + | ± | + | + | + | ++ |
| L-arabinose | − | − | − | + | − | − | − | − | − |
| D-xylose | − | − | − | + | − | − | − | − | − |
| L-rhamnose | − | − | − | − | − | − | − | − | − |
| D-fructose | + | + | − | − | − | − | + | − | − |
| D-galactose | + | + | ++ | + | + | + | + | + | − |
| D-glucose | + | + | ++ | + | + | ++ | + | + | ++ |
| D-mannose | + | + | − | + | − | − | + | ± | − |
| Sucrose | + | + | + | + | + | ++ | + | + | + |
| Lactose | + | + | + | + | + | − | + | ± | − |
| Maltose | + | + | ++ | + | + | ++ | + | + | ++ |
| D-raffinose | ± | − | − | − | − | − | ± | − | ± |
| Inositol | + | − | + | ± | − | − | + | + | ± |
| D-mannitol | − | − | − | − | − | − | − | − | − |
| D-sorbitol | − | − | − | − | − | − | − | − | − |
| Dulcitol | − | − | − | − | − | − | − | − | − |
| Starch | + | + | ++ | + | + | + | + | + | ++ |
| Cellulose | − | − | − | − | − | − | − | − | − |
| Inuline | − | − | − | − | − | − | − | − | − |
| Salicine | + | + | + | + | + | − | + | + | ± |

[1] Basal Medium I: 0.1% NH$_4$NO$_3$, 0.1% K$_2$HPO$_4$, 0.03% KH$_2$PO$_4$ 0.05% MgSO$_4$·7H$_2$O, 0.01% CaCl$_2$·2H$_2$O, 0.05% NaCl with 10 mcg./ml. each of aspartate, glutamate and tryptophane, 1 mcg./ml. of nicotinic acid, 0.05 mcg./ml. of biotin.
[2] Basal Medium II: 0.1% NH$_4$Cl, 0.1% K$_2$HPO$_4$, 0.05% MgSO$_4$·7H$_2$O, 0.05% NaCl, 0.1% CaCO$_3$, 0.01% yeast extract, 1.5% Bacto-agar with 1 mcg./ml. of nicotinic acid, 0.05 mcg./ml. of biotin.
[3] Basal Medium III: Peptone broth.

three strains were concluded to belong to species of *Bacillus circulans*. Significant differences of each of the three strains from the typical *B. circulans* are summarized below:

Strain C308–B4:
  Color of Colony: Pale orange.
  Growth factor: Nicotinic acid, biotin and amino acids complex accelerate the growth.
  Sugar utilization: L-Arabinose and D-xylose are not utilized.

Strain C436–B1:
  Glucose broth: Weakly alkaline reaction (pH 7.5–8.0) after 3–5 days.
  Growth temperature: Lower optimum temperature (30° C.) and no growth at 45° C.
  Growth factor: Nicotinic acid, biotin and amino acids complex accelerate the growth.

Strain C532–B2:
  Growth factor: Biotin is essential for the growth.
  Sugar utilization: L-Arabinose and D-xylose are not utilized.

In view of the above differences, the following subspecies names were proposed for the three strains of Bu–1975 producing organism.

*Bacillus circulans* subsp. n. *croceus* (Strain C308–B4).
*Bacillus circulans* subsp. n. *proteophilus* (Strain C436–B1).
*Bacillus circulans* subsp. n. *biotinicus* (Strain C532–B2).

Antibiotic Production

A well-grown agar slant of the Bu–1975-producing organism was used to inoculate the seed medium containing 1.5% glucose, 0.5% polypeptone, 0.2% yeast extract, 0.05% K$_2$HPO$_4$ and 0.05% MgSO$_4$·7H$_2$O, the pH being adjusted to 7.5 before sterilization. The seed culture was incubated at 37° C. for 24 hours on a rotary shaker (250 r.p.m.), and 2 ml. of the growth was transferred to 100 ml. of the fermentation medium in a 500-ml. Erlenmeyer flask, which has a composition of 3% soybean, meal 2% corn starch, 1% $CaCO_3$ and 0.33% $MgSO_4 \cdot 7H_2O$. Antibiotic production reached a maximum after 3–6 days shaking at 28° C.

The antibiotic activity in the fermentation broth was determined by the paper disc-agar diffusion assay using *Bacillus subtilis* PC1219 and *Klebsiella pneumoniae* A20680. All components of Bu–1975 complex ($A_1$, $A_2$, B, $C_1$ and $C_2$) showed activity against *B. subtilis* PC1219 but only two components, $C_1$ and $C_2$, were active against *K. pneumoniae* A20680.

The productivity of the C components relative to the other components were different among the strains. In the shaking flask fermentation, strain C532–B2 produced 50–100 mcg./ml. of the C components which represented about 30–50% of the total bio-activity assayed by *B. subtilis*. Other strains were less productive of the C components than strain C532–B2.

Isolation and Purification

The harvested broth was filtered using filter aid and the bio-activity in the filtrate (pH 8.0) was absorbed by a column of Amberlite IRC–50 ($NH_4^+$ form). The column was washed with water and then developed by 1 N $NH_4OH$ solution. The active eluates were combined, concentrated *in vacuo* and extracted with n-butanol to remove component B in the concentrate. The aqueous layer was separated and applied on a column of Amberlite CG–50 ($NH_4^+$ form). The column was washed by water and N/4 $NH_4OH$ solution successively, and the activity was eluted by N/2 $NH_4OH$, the eluate being collected fractionally. The active components were eluted in the order of $A_2$, $A_1$, $C_2$ and $C_1$, though with considerable overlap of the components, and the complete separation of each component was achieved after repeating the CG–50 column chromatography.

As shown in Table 4, two TLC (thin layer chromatography) systems, S–110 and S–117, were found suitable to differentiate components $A_1$ and $A_2$ from components $C_1$ and $C_2$, and system S–115, when developed for 16 hours, enabled the separation of $A_1$ from $A_2$ and $C_1$ from $C_2$.

Components $A_1$ and $A_2$ were identified with ambutyrosins A and B [1], respectively, by the physico-chemical properties (TLC, IR and NMR) and antibacterial spectrum.

Physico-chemical Properties of Components $C_1$ and $C_2$

Components $C_1$ and $C_2$ are white amorphous solid bases, which are readily soluble in water, slightly soluble in methanol and ethanol, and practically insoluble in n-butanol, acetone and other organic solvents. Both components give positive reactions with ninhydrin and anthrone reagents but are negative in Tollens, Fehling and Sakaguchi reactions.

An analytical sample of $C_1$ was isolated in a form of dicarbonate, which melted at about 155° C. (decomp.), $[\alpha]_D^{25} = +26.7°$ (c. 1.0, water), and analyzed as

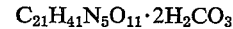

$$C_{21}H_{41}N_5O_{11} \cdot 2H_2CO_3$$

*Anal.*—Calc'd.: C, 41.63; H, 6.83; N, 10.55. Found: C, 41.52; H, 6.47; N, 10.47.

It gave tetra-N-acetate, m.p. >250° C., $[\alpha]_D^{24.5} = 26.0°$ (c. 0.5, water), which analyzed as

$$C_{21}H_{41}N_5O_{11}(C_2H_2O)_4 \cdot 3/2H_2O$$

*Anal.*—Calc'd.: C, 47.40; H, 7.13; N, 9.53. Found: C, 47.30; H, 7.47; N, 9.65.

Component $C_2$ melted at 172–178° C. (decomp.), $[\alpha]_D^{25} = +30.0°$ (c. 1.0, water), and analyzed as

$$C_{21}H_{41}N_5O_{11} \cdot 2H_2CO_3$$

*Anal.*—Calc'd.: C, 41.63; H, 6.83; N, 10.55. Found: C, 41.22; H, 6.67; N, 10.82. The tetra-N-acetate of $C_2$ was also prepared, m.p.>250° C., $[\alpha]_D^{24.5} = +43°$ (c. 0.5, water), and analyzed as $C_{21}H_{41}N_5O_{11} \cdot (C_2H_2O)_4 \cdot H_2O$.

*Anal.*—Calc'd.: C, 47.99; H, 7.08; N, 9.65. Found: C, 48.09; H, 7.20; N, 9.42.

Antibiotics $C_1$ and $C_2$ show end absorption only in the ultra violet region. The infrared (IR) spectra of $C_1$ and $C_2$ are quite similar to those of ambutyrosin A and B. The nuclear magnetic spectrum (NMR of $C_1$ shows two anomeric protons at δ 5.28 (s) and 6.10 (d, J=3.5Hz.) p.p.m., the lower-field signal being different from that in the NMR spectrum of $C_2$ which shows the anomeric protons at δ 5.28 (s) and 5.98 (d, J=3.5Hz.) p.p.m. Similar difference in the chemical shift of the second anomeric protons has been seen in the NMR spectra of ambutyrosin A and B. The comparative NMR data of $C_1$ and $C_2$ along with ambutyrosin A and B are shown in Table 5. It is also shown in the Table that the ratio of integral protons at the higher (δ 1.2–2.4 p.p.m.) and the lower (δ 2.5–4.4 p.p.m.) methylene-methine regions is 6:18 for $C_1$ and $C_2$ in contrast to the ratio of 4:19 for ambutyrosin A and B.

TABLE 5
Comparative NMR data of Components $C_1$ and $C_2$ with Ambutyrosins A and B
(60 mHz, in $D_2O$ pH 2.0)

| Chemical shift (δ, p.p.m.) | Number of protons and type of signals | | | |
| --- | --- | --- | --- | --- |
| | Bu–1975 $C_1$ | Bu–1975 $C_2$ | Ambutyrosin A | Ambutyrosin B |
| 1.2–2.4 | 6H (m) | 6H (m) | 4H (m) | 4H (m) |
| 2.5–4.4 | 18H (m) | 18H (m) | 19H (m) | 19H (m) |
| 5.16 | | | 1H (s) | 1H (s) |
| 5.28 | 1H (s) | 1H (s) | | |
| 5.98 | | 1H (d, J=3.5 Hz.) | | 1H (d, J=3.6 Hz.) |
| 6.10 | 1H (d, J=3.5 Hz.) | | 1H (d, J=3.6 Hz.) | |

The following descriptions are mostly confined to components $C_1$ and $C_2$ of antibiotic Bu–1975.

[1] The antibiotic complex which was identified with ambutyrosins A and B had been isolated in our screening program and was employed as reference in the present study.

Biological Activities

Antibacterial Spectrum: The minimum inhibitory concentrations (MIC) of $C_1$ and $C_2$ were determined TABLE 4
[TLC of Bu–1975 components]

| System | Plate | Solvent system | Rf | | | |
| --- | --- | --- | --- | --- | --- | --- |
| | | | $A_1$ | $A_2$ | $C_1$ | $C_2$ |
| S–110 [1] | Silica gel | $CHCl_3$—MeOH—28%$NH_4OH$—$H_2O$ (1:4:2:1) | 0.41 | 0.41 | 0.51 | 0.51 |
| S–117 | do | $CHCl_3$—MeOH—28%$NH_4OH$ (1:3:2) | 0.20 | 0.20 | 0.26 | 0.26 |
| S–115 [2] | Alumina | $CHCl_3$—MeOH—28%$NH_4OH$ (2:1:1) | 3.7 cm | 0.2 cm | 5.3 cm | 0.5 cm |

[1] Three times development.
[2] 16 hours development, location is shown in cm. from the origin.

against a wide variety of bacteria by the two-fold agar dilution method on NutrientAgar (Eiken) plates using the Steer's multi-inoculating apparatus. Inoculum size was standardized to be $10^{-4}$ dilution of overnight culture of the test organisms in Heart Infusion Broth (Difco). Mycobacterium strains were tested on plates containing No. 1001 agar medium,[2] the inoculum size being $10^{-3}$ dilution of the overnight culture. The results are shown in Table 6 along with those of ambutyrosin A and kanamycin which were comparatively tested as reference antibiotics.

[2] 3% glycerol, 0.3% sodium L-glutamate, 0.2% peptone, 0.31% Na₂HPO₄, 0.1% KH₂PO₄, 0.005% ammonium citrate, 0.001% MgSO₄, 1.5% agar.

TABLE 6

[Antibacterial spectra of components $C^1$ and $C^2$]

| Test organisms | MIC (mcg./ml.) | | | |
|---|---|---|---|---|
| | $C_1$ | $C_2$ | Kanamycin | Ambutyrosin A |
| *Staphylococcus aureus:* | | | | |
| Smith | 0.4 | 0.8 | 0.2 | 0.4 |
| 209P | 3.1 | 3.1 | 0.8 | 3.1 |
| A20239 | 1.6 | 1.6 | 50 | 1.6 |
| *Sarcina lutea* PCI 1001 | 6.3 | 6.3 | 3.1 | 6.3 |
| *Escherichia coli:* | | | | |
| NIHJ | 0.8 | 0.8 | 0.8 | 0.8 |
| Juhl | 0.8 | 0.8 | 0.8 | 0.8 |
| A15169 | 0.8 | 1.6 | 0.8 | 0.8 |
| A20363 | 0.8 | 0.8 | >100 | 0.8 |
| A9844 | 0.4 | 0.8 | 0.8 | 0.4 |
| A20365 | 0.2 | 0.2 | 100 | 0.2 |
| K12 | 0.4 | 0.8 | 0.8 | 0.4 |
| A20664 | 0.8 | 3.1 | 3.1 | 0.8 |
| A20665 | 0.4 | 0.8 | 100 | 0.4 |
| A9535 | 0.4 | 0.8 | 0.8 | 0.8 |
| A15148 | 0.8 | 0.8 | 0.8 | 0.8 |
| A15164 | 0.4 | 0.8 | 0.8 | 0.8 |
| A15170 | 0.8 | 1.6 | 1.6 | 0.8 |
| A20102 | 0.4 | 0.8 | 0.8 | 0.8 |
| A20684 | 0.8 | 0.8 | 0.4 | 0.8 |
| A20683 | 0.8 | 1.6 | 100 | 25 |
| *Klebsiella pneumoniae:* | | | | |
| D11 | 0.1 | 0.2 | 0.2 | 0.2 |
| A20680 | 0.8 | 1.6 | 100 | 50 |
| *Klebsiella sp.:* | | | | |
| A9661 | 0.8 | 0.8 | 0.8 | 1.6 |
| A9662 | 0.8 | 0.8 | 0.8 | 0.8 |
| *Proteus vulgaris:* | | | | |
| A9436 | 0.2 | 0.2 | 0.4 | 0.1 |
| A9526 | 0.4 | 0.4 | 0.4 | 0.2 |
| A9699 | 1.6 | 1.6 | 0.8 | 0.8 |
| ATCC9920 | 0.4 | 0.4 | 0.4 | 0.4 |
| A9539 | 0.2 | 0.4 | 0.2 | 0.2 |
| A9716 | 1.6 | 1.6 | 0.8 | 1.6 |
| *Proteus morganii:* | | | | |
| A9553 | 0.4 | 0.4 | 0.8 | 1.6 |
| A20031 | 0.8 | 0.8 | 3.1 | 0.8 |
| A9636 | 1.6 | 1.6 | 1.6 | 1.6 |
| A15153 | 1.6 | 1.6 | 1.6 | 1.6 |
| A15166 | 0.4 | 0.4 | 0.2 | 0.4 |
| A20455 | 1.6 | 1.6 | 1.6 | 1.6 |
| A20457 | 1.6 | 1.6 | 1.6 | 1.6 |
| *Proteus rettgeri* A9637 | 0.8 | 0.8 | 0.8 | 0.8 |
| *Proteus inconstans* A20615 | 1.6 | 1.6 | 0.8 | 0.8 |

TABLE 6—Continued

| Test organisms | MIC (mcg./ml.) | | | |
|---|---|---|---|---|
| | $C_1$ | $C_2$ | Kanamycin | Ambutyrosin A |
| *Proteus mirabilis:* | | | | |
| A9554 | 0.8 | 0.8 | 0.4 | 1.6 |
| A9900 | 0.4 | 0.8 | 0.4 | 1.6 |
| A20119 | 1.6 | 1.6 | 0.8 | 3.1 |
| A20454 | 1.6 | 1.6 | 0.8 | 0.8 |
| *Serratia marcescens* A20019 | 1.6 | 6.3 | 0.8 | 6.3 |
| *Pseudomonas aeruginosa:* | | | | |
| D15 | 3.1 | 3.1 | 25 | 6.3 |
| A9923 | 6.3 | 6.3 | 50 | 12.5 |
| A9930 | 0.4 | 0.4 | 12.5 | 1.6 |
| D113 | 25 | 25 | >100 | >100 |
| A15150 | 12.5 | 12.5 | 25 | 12.5 |
| A15194 | 6.3 | 3.1 | 25 | 6.3 |
| A20479 | 6.3 | 12.5 | 100 | 12.5 |
| A20616 | 6.3 | 12.5 | 50 | 12.5 |
| A20653 | 100 | 25 | >100 | >100 |
| A9843 | 6.3 | 3.1 | 100 | 25 |
| A20717 | 6.3 | 6.3 | 50 | 12.5 |
| A20718 | 6.3 | 6.3 | 50 | 12.5 |
| D114 | 6.3 | 6.3 | 25 | 12.5 |
| *Pseudomonas sp.:* | | | | |
| A20355 | 3.1 | 3.1 | 50 | 6.3 |
| A20358 | 3.1 | 3.1 | 12.5 | 6.3 |
| A20368 | 12.5 | 12.5 | 25 | 12.5 |
| A20598 | 12.5 | 12.5 | 25 | 12.5 |
| A20600 | 6.3 | 6.3 | >100 | 12.5 |
| A20603 | 25 | 25 | >100 | 100 |
| A20618 | >100 | >100 | >100 | >100 |
| A20594 | 12.5 | 12.5 | 50 | 12.5 |
| *Mycobacterium* 607 | 0.4 | 0.4 | 0.4 | 0.4 |
| *Mycobacterium phlei* | 0.2 | 0.2 | 0.4 | 0.2 |
| *Mycobacterium ranae* | 0.4 | 0.4 | 0.4 | 0.4 |

$C_1$ and $C_2$ have essentially the same level of intrinsic potency. They exhibit a broad spectrum of antibacterial activity against gram-positive and gram-negative bacteria including those which are resistant to the commonly used aminoglycoside antibiotics such as streptomycin, neomycin, kanamycin and gentamycin. In general, the activity and spectrum of $C_1$ and $C_2$ are similar to those of ambutyrosin. However, $C_1$ and $C_2$ have a broader spectrum than ambutyrosin, inhibiting some of ambutyrosin-resistant organisms and showing somewhat greater anti-pseudomonas activity than ambutyrosin. The activity of $C_1$ was compared with reference aminoglycoside antibiotics against selected set of organisms which include two sensitive standard strains (*S. aureus* Smith, *E. coli* Juhl), six resistant organisms (*S. aureus*, *E. coli*, *K. pneumoniae*) and ten *Pseudomonas* species. The results are shown in Table 7. It can be seen that $C_1$ is active against various type of resistant organisms whose mechanisms of resistance are known or thought to be phosphorylation, acetylation and adenylation.

TABLE 7

[Activity of $C^1$ against Aminoglycoside-resistant organisms]

| Organisms | MIC (mcg./ml.) | | | | | |
|---|---|---|---|---|---|---|
| | $C^1$ | Ambutyrosin A | Kanamycin A | Streptomycin | Neomycin B | Gentamicin C |
| *S. aureus:* | | | | | | |
| Smith | 0.4 | 0.4 | 0.2 | 0.8 | 0.4 | 0.2 |
| A20239 | 1.6 | 1.6 | 50 | >100 | 50 | 0.4 |
| *E. coli:* | | | | | | |
| Juhl | 0.8 | 0.8 | 0.8 | 6.3 | 1.6 | 0.4 |
| A20363 | 0.8 | 0.8 | 100 | 25 | 100 | 0.8 |
| A20664 | 0.8 | 0.8 | 3.1 | 6.3 | 3.1 | 0.4 |
| A20665 | 0.4 | 0.4 | 100 | 25 | 50 | 0.4 |
| A20683 | 0.8 | 25 | 100 | 100 | 100 | 25 |
| *K. pneumoniae* A20680 | 0.8 | 50 | 100 | >100 | >100 | 50 |
| *P. aeruginosa:* | | | | | | |
| D15 | 3.1 | 6.3 | 25 | 25 | 3.1 | 3.1 |
| D113 | 25 | >100 | >100 | >100 | 50 | 12.5 |
| D114 | 6.3 | 12.5 | 25 | | 100 | 6.3 |
| A9843 | 6.3 | 25 | 100 | 25 | 100 | 6.3 |
| A20653 | 100 | >100 | >100 | >100 | >100 | 6.3 |
| A20718 | 6.3 | 12.5 | 50 | >100 | 50 | >100 |
| *Pseudomonas sp.:* | | | | | | |
| A20355 | 3.1 | 6.3 | 50 | 100 | 50 | 0.8 |
| A20358 | 3.1 | 6.3 | 12.5 | 25 | 100 | 6.3 |
| A20603 | 25 | 100 | >100 | >100 | >100 | 100 |
| A20618 | >100 | >100 | >100 | >100 | >100 | >100 |

*In Vivo* Activity and Toxicity Component $C_1$ was evaluated *in vivo* comparatively with ambutyrosin A in experimental infections of mice. The pathogenic bacteria employed were *S. aureus* Smith, *E. coli* NIHJ and *K. pneumoniae* A20680, the last one being the kanamycin- and ambutyrosin-resistant organism. Mice were challenged intraperitoneally with the pathogens in a 5% suspension of hog gastric mucin, and the challenge dose was controlled to be 100 x $LD_{50}$. A single subcutaneous treatment with the antibiotic was made immediately after the bacterial challenge. Group of five mice was used for one dosage level and the animals were observed for five days to determine the median curative dose ($CD_{50}$).

The results of the *in vivo* experiments are shown in Table 8. $C_1$ afforded excellent protection in mice against all of the three infections tested. Ambutyrosin A showed comparable *in vivo* activity to that of $C_1$ against the sensitive *S. aureus* and *E. coli* infections but was inactive against the resistant *K. pneumoniae* infection.

The acute toxicity of $C_1$ was determined in mice. The intravenous $LD_{50}$ was 720 mg./kg. for the sulfate of $C_1$ and greater than 1000 mg./kg. for the free base form. In a comparative experiment the intravenous $LD_{50}$ of kanamycin sulfate and ambutyrosin sulfate were found to be 280 mg./kg. and 720 mg./kg., respectively.

TABLE 8

[*In vivo* activity of $C^1$]

| Dose (sc.) mg./kg. | $C^1$ | Ambutyrosin A |
|---|---|---|
| *S. aureus* Smith infection* | | |
| 25 | 5/5 | 5/5 |
| 12.5 | 5/5 | 5/5 |
| 6.25 | 4/5 | 4/5 |
| 3.12 | 3/5 | 3/5 |
| 1.56 | 2/5 | 1/5 |
| $CD_{50}$, mg./kg. | 2.5 | 2.9 |
| *E. coli* NIHJ infection* | | |
| 25 | 5/5 | 5/5 |
| 12.5 | 5/5 | 4/5 |
| 6.25 | 4/5 | 3/5 |
| 3.12 | 2/5 | 3/5 |
| 1.56 | 0/5 | 1/5 |
| $CD_{50}$, mg./kg. | 3.8 | 3.7 |
| *K. pneumoniae* A20680 infection* | | |
| 100 |  | 1/5 |
| 50 |  | 1/5 |
| 25 | 5/5 | 0/5 |
| 12.5 | 3/5 | 0/5 |
| 6.25 | 2/5 | 0/5 |
| 3.12 | 2/5 | 0/5 |
| 1.56 | 1/5 |  |
| $CD_{50}$, mg./kg. | 6.3 | >100 |

*No. survived/No. infected.

NOTE.—Determined by the method of J. I. Reed et al., American J. Hygiene, 27, 493–497 (1938).

In recent years there has been remarkable progress in elucidating the mechanisms of R-factor mediated resistance to the aminoglycoside antibiotics. These resistant organisms are now known to produce bacterial enzymes which inactivate aminoglycoside antibiotics by acetylation [5,6,7,8], phosphorylation [9,10,11,12] and adenylation [13,14,15]. Kanamycin phosphorylase is known to react with kanamycins, nemoycins and paromomycins at the 3'-hydroxy group to yield bio-inactive, phosphorylated products [16]. Gentamicins $C_1$, $C_2$ and $C_{1a}$, tobramycin [17] and dideoxykanamycin B [18], which have no hydroxy group in the 3'-position, are incapable of the phosphorylative inactivation. Ambutyrosin is not inactivated by the kanamycin phosphorylase (unpublished data) though it has a 3'-hydroxy group, and the resistance of ambutyrosin to this enzymatic inactivation is supposed to be due to the acyl substitution of 1-amino function with L-(−)-γ-amino-α-hydroxybutyric acid. This is also the case with $C_1$ and $C_2$, which showed activity against the kanamycin-resistant organisms that produce kanamycin phosphorylase. This is quite natural since $C_1$ and $C_2$ have the structure of 4'-deoxyambutyrosin A and B.

A further interesting finding was that $C_1$ and $C_2$ inhibited growth of *K. pneumoniae* A20680 [3] and *E. coli* A20683 [4], which were known to inactivate gentamicin C components [14] and 3',4'-dideoxykanamycin B [15] by adenylation, and kanamycin, neomycin and streptomycin by phosphorylation [14]. As can be seen in Tables 6 and 7, ambutyrosin lacks activity in this type of resistant organisms.

Antibiotic complex Bu–1975, and particularly the purified components $C_1$ and $C_2$, are valuable as antibacterial agents, nutritional supplements in animal feeds, therapeutic agents in poultry and animals, including man, and are especially valuable in the treatment of infectious diseases caused by Gram-positive and Gram-negative bacteria.

$C_1$ and $C_2$ when administered orally are useful as an adjunctive treatment for preoperative sterilization of the bowel. Both aerobic and anaerobic flora which are susceptible to these drugs are reduced in the large intestine. When accompanied by adequate mechanical cleansing, they are useful in preparing for colonic surgery.

$C_1$ and $C_2$ are effective in the treatment of systemic bacterial infections when administered parenterally in the dosage range of about 250 mg. to about 3000 mg. per day in divided doses three or four times a day. Generally the compounds are effective when administered at a dosage of about 5.0 to 7.5 mg./kg. of body weight every 12 hours.

---

[5] Umezawa, H.; M. Okanishi, R. Utahara, K. Maeda and S. Kondo: Isolation and structure of kanamycin inactivated by a cell free system of kanamycin resistant *E. coli*. J. Antibiotics, Ser. A *20* : 136–141, 1967.

[6] Okanishi, M.; S. Kondo, R. Utahara and H. Umezawa: Phosphorylation and inactivation of aminoglycosidic antibiotics by *E. coli* carrying R factor. J. Antibiotics *21* (1) : 13–21, 1968.

[7] Benveniste, R.; and J. Davies: Enzymatic acetylation of aminoglycoside antibiotics by *Escherichia coli* carrying an R factor. Biochemistry *10* (10) : 1787–1796, 1971.

[8] Brzezinska, M.; R. Benveniste, J. Davies, P. J. Daniels and J. Weinstein: Gentamicin resistance in strains of *Pseudomonas aeruginosa* mediated by enzymatic N-acetylation of the deoxystreptamine moiety. Biochemistry, *11* : 761–765, 1972.

[9] Umezawa, H.; M. Okanishi, S. Kondo, K. Hamana, R. Utahara, K. Maeda and S. Mitsuhasi: Phosphorylative inactivation of aminoglycosidic antibiotics by *Escherichia coli* carrying R factor. Science *157* : 1559–1561, 1967.

[10] Okanishi, M.; S. Kondo, R. Utahara and H. Umezawa: Phosphorylation and inactivation of aminoglycosidic antibiotics by *E. coli* carrying R factor J. Antibiotics *21* : 13–21, 1968.

[11] Umezawa, H.; O. Doi, M. Ogura, S. Kondo and N. Tanaka. Phosphorylation and inactivation of kanamycin by *Pseudomonas aeruginosa*. J. Antibiotics *21* : 154–155, 1968.

[12] Ozanne, B.; R. Benveniste, D. Tipper and J. Davies: Aminoglycoside antibiotics: Inactivation by phosphorylation in *Escherichia coli* carrying R factors. J. Bacteriol. *100* (2) : 1144–1146, 1969.

[13] Umezawa, H.; S. Takasawa, M. Okanishi and R. Utahara: Adenylylstreptomycin, a product of streptomycin inactivated by *E. coli* carrying R factor. J. Antibiotics *21* : 81–82, 1968.

[14] Benveniste, R. and J. Davies: R factor mediated gentamicin resistance: A new enzyme which modifies aminoglycoside antibiotics. FEBS Letters *14* (5) : 293–296, 1971.

[15] Yagisawa, M.; H. Naganawa, S. Kondo, M. Hamada, T. Takeuchi and H. Umezawa: Adenyldideoxykanamycin B, a product of the inactivation of dideoxykanamycin B by *Escherichia coli* carrying R factor. J. Antibiotics. *24* (12) : 911–912, 1971.

[16] Davies, J.; M. Brzezinska and R. Benveniste: R factors: Biochemical mechanisms of resistance of aminoglycoside antibiotics. Ann. N.Y. Acad. Sci. *182* : 226–233, 1971.

[17] Koch, K. F. and J. A. Rhoades: Structure of nebramycin factor 6, a new aminoglycosidic antibiotic. Antimicrobial Agent Chemotherapy *1970* : 309–313, 1971.

[18] Umezawa, H.; S. Umezawa, T. Tsuchiya and Y. Okazaki: 3', 4'-Dideoxykanamycin B active against kanamycin-resistant *Escherichia coli* and *Pseudomonas aeruginosa*. J. Antibiot. *24* : 485–487, 1971.

[19] Martin, C. M.; N. S. Ikari, J. Zimmerman and J. A. Waitz: A virulent nosocomial *Klebsiella* with a transferable R factor of Genamicin: Emergence and suppression. J. Infect. Dis. *124* (Supplement) S24–S29, 1971.

[3] *K. pneumoniae* A20680 is originated from the strain of *Klebsiella* type 22 No. 3038 (see footnotes 14 and 19).

[4] *E. coli* A20683 is originated from the strain of *E. coli* JR66/W677 (see footnote 14).

A preferred embodiment of the present invention is a compound selected from the group comprising

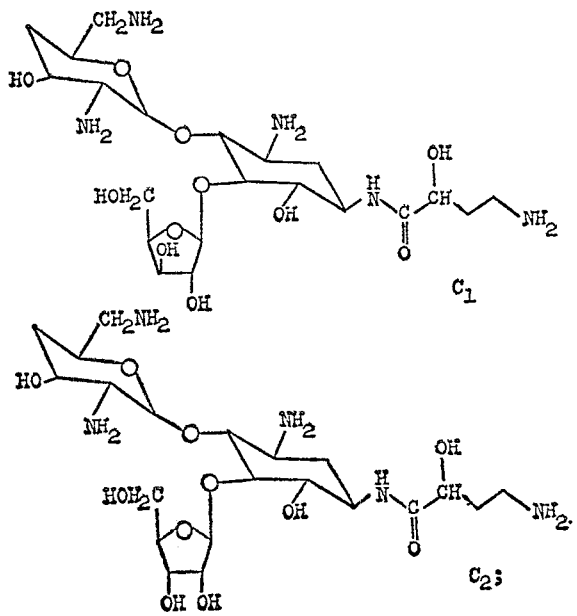

or a pharmaceutically acceptable acid addition salt thereof.

A more preferred embodiment is the compound designated herein as the antibiotic $C_1$; or a pharmaceutically acceptable acid addition salt thereof.

Another preferred embodiment is the compound designated herein as the antibiotic $C_2$; or a pharmaceutically acceptable acid addition salt thereof.

Most preferred embodiments are the monosulfate, disulfate, unhydrated, monohydrated and polyhydrated forms of the antibiotics $C_1$ and $C_2$.

For the purpose of this disclosure, the term "nontoxic pharmaceutically acceptable acid addition salt" shall mean a mono, di-, tri- or tetrasalt formed by the interaction of one molecule of $C_1$ or $C_2$ with 1–4 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

Another preferred embodiment is the process for the preparation of the antibiotics having the formula

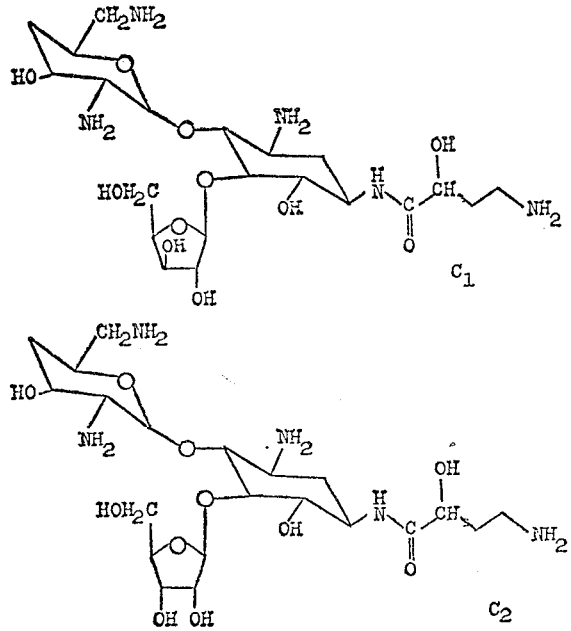

which comprises fermenting the antibiotics using the cultures designated *Bacillus circulans* subsp. n. *croceus* (A.T.C.C. 21820), *Bacillus circulans* subsp. n. *proteophilus* (A.T.C.C. 21821), or *Bacillus circulans* subsp. n. *Biotinicus* (A.T.C.C. 21822) by aerobic fermentation and subsequently isolating the antibiotic components.

Amberlite IRC 50 is the trade name for a weakly acidic cationic exchange resin of a carboxylic-polymethacrylic type.

Amberlite CG 50 is the trade name for the chromatographic grade of a weakly acidic cationic exchange resin of a carboxylic-polymethacrylic type.

Example 1

Agar slant culture of *B. circulans* strain C532–B2 was used to inoculate 100 ml. of medium No. YGP-1 (1.5% glucose, 0.5% polypeptone, 0.2% yeast extract, 0.05% $K_2HPO_4$ and 0.05% $MgSO_4 \cdot 7H_2O$) in a 500 ml. Erlenmeyer flask. The seed culture was incubated at 37° C. for 24 hours on rotary shaker (250 r.p.m.) and each 2 ml. of the growth was transferred to 100 ml. of fermentation medium No. 132 (3% soybean meal, 2% corn starch, 1% $CaCO_3$ and 0.33% $MgSO_4 \cdot 7H_2O$). After six days' shaking culture at 28° C., the paper disc (8 mm.) assay of the fermentation broth showed 25 mm. inhibition zone on *B. subtilis* PCI219 plate and 16 mm. zone of *K. pneumoniae* A20680 plate. Combined fermentation broth (200 flasks, 17 l.) was filtered and absorbed by a column of Amberlite IRC–50 ($NH_4^+$ form, 500 ml.). The column was washed with water and then eluted by 2.2 l of 1N $NH_4OH$ solution. The active eluates were combined, concentrated *in vacuo* and extracted with n-butanol. Evaporation of the butanol extract gave 1.3 g. of crude solid (component B). The aqueous layer was concentrated *in vacuo* to about 30 ml. which was applied on a column of Amberlite CG–50 ($NH_4^+$ form). The column was washed with 500 ml. of N/10 $NH_4OH$ and 700 ml. of N/4 $NH_4OH$ successively, and the bioactivity was eluated by N/2 $NH_4OH$ solution. The eluate was collected fractionally and traced by bio-assay, ninhydrin reaction and TLC. The active components were eluted in the order of $A_2$, $A_1$, $C_2$ and $C_1$.

| Tube Nos: | Volume, ml. | TLC | Estimated ratio | Solid, mgs |
|---|---|---|---|---|
| 69–87 | 200 | $A_2+A_1$ | 4:6 | 228 |
| 88–111 | 250 | $A_1+C_2$ | 3:7 | 193 |
| 112–159 | 500 | $C_1$ | | 201 |

Repeated column chromatography (CG–50, $NH_4^+$ form) of the second and third solids gave pure preparations of 120 mg. of $C_2$ and 100 mg. of $C_1$, respectively.

Example 2

*B. circulans* strain C532–B2–H48, which was obtained by the monospore isolation technique from the parent strain of C532–B2, was tested. Similar shake flask fermentation as in Example 1 gave a maximum potency at fifth day (pH 9.3), showing 30 mm. inhibition zone on *B. subtilis* PCI 219 plate and 21 mm. zone on *K. pneumoniae* A20680 plate. The assay value indicated that the broth contained about 150 mcg./ml. of component A and about 100 mcg./ml. of component C.

Example 3

*B. circulans* strain C308–B4 was used as a seed culture and shake flask fermentation was conducted as in Example 1. The harvested broth (18 l.) contained 75 mg. of component A ($A_1+A_2$), 6.4 g. of component B and 75 mg. of component C ($C_1+C_2$).

Example 4

*B. circulans* strain C436–B1 was used as a seed culture and shake flask fermentation was conducted as in Example 1. The harvested broth (20 l.) contained 71 mg. of component A ($A_1+A_2$), 4.1 g. of component B and 66 mg. of component C ($C_1+C_2$).

Example 5

Submerged and aerated fermentation experiment was carried out in 20-l. jar fermentors. *B. circulans* strain C532-B2-H48 was used to inoculate 10 l. of medium No. YGP-1 (pH 7.2 after sterilization). The seed culture was stirred at 250 r.p.m. at 35° C. with aeration rate of 10 l./min., and gave vigorous growth after 11 hours (pH 6.0). At 11.5 hours, 1 l. of the seed culture was transferred to 10 l. of sterilized production medium No. 132. The fermentation was carried out at 28° C. with aeration rate of 11.5 l./min. Frequent additions of silicone antifoam (KM-70) were necessary to control the excessive foaming. A peak potency of the broth was attained at 70 hours (pH 8.2), and the differential assay using *B. subtilis* PCI 219 and *K. pneumoniae* A20680 showed 79 mcg./ml. of component A ($A_1+A_2$) and 49 mcg./ml. of component C ($C_1+C_2$).

Example 6

Larger scale fermentation was carried out in pilot plant tanks capable of fermenting 100 l. and 300 l. volumes. The fermentation conditions were similar to those of Example 5 except that the agitation rate was 180 r.p.m. and the incubation temperature of production medium was 32° C. After 50 hours' fermentation (pH 8.7), the broth potency reached 95 mcg./ml. of component A and 45 mcg./ml. of component C.

Example 7

Harvested broth from two 300-l. tanks (650 l.) containing about 20 mcg./ml. of component C was filtered at pH 8.5 and stirred with 8.6 l. of Amberlite IRC-50 ($NH_4^+$ form). The resin was separated, washed with 80 l. of water and then eluted batchwise with 1 N $NH_4OH$ solution (10 l. x 3). The eluates were combined and concentrated *in vacuo* at 35-40° C. to about 500 ml. volume which contained 11.3 gram unit of component A and 7.3 gram unit of component C. The concentrate was extracted with n-butanol to remove contaminated component B, and the aqueous layer was stirred with 200 ml. of Amberlite CG-50 ($NH_4^+$ form). The resin was separated, washed with 5 l. of water and then placed on a top of CG-50 column ($NH_4^+$ form, 1500 ml.). The column was developed with 7 l. of N/4 $NH_4OH$. The activity was eluted with N/2 $NH_4OH$ and the eluates were collected fractionally, yielding 7.2 g. of component A from tube Nos. 491-800 and 4.2 g. of component C from tube Nos. 931-1370. Mixture of components A and C, 1.8 g., was recovered from tube Nos. 801-930.

We claim:

1. A compound selected from the group comprising

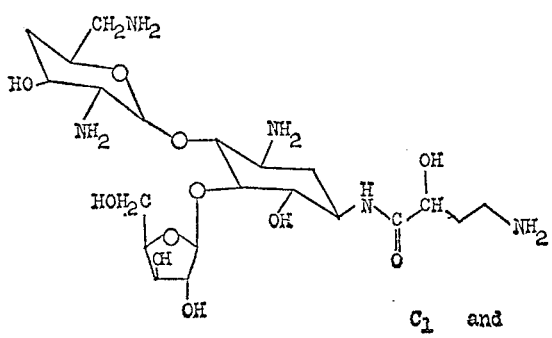

$C_1$ and

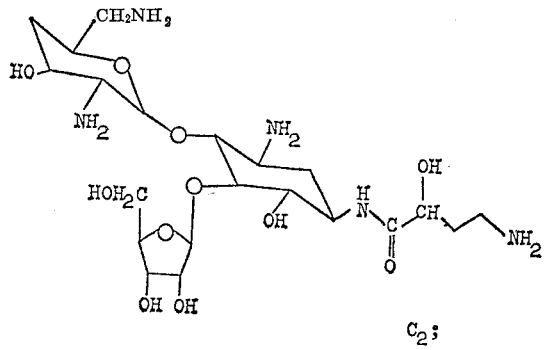

$C_2$;

or a pharmaceutically acceptable acid addition salt thereof.

2. The compound of claim 1 having the formula

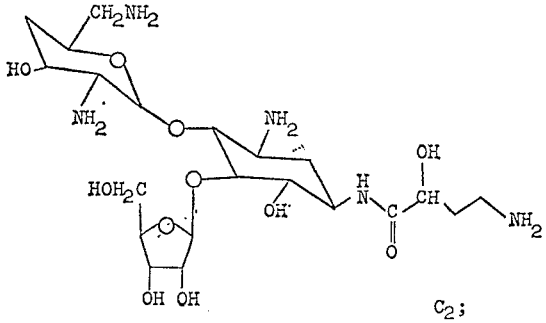

$C_2$;

or a pharmaceutically acceptable acid addition salt thereof.

3. The compound of claim 1 having the formula

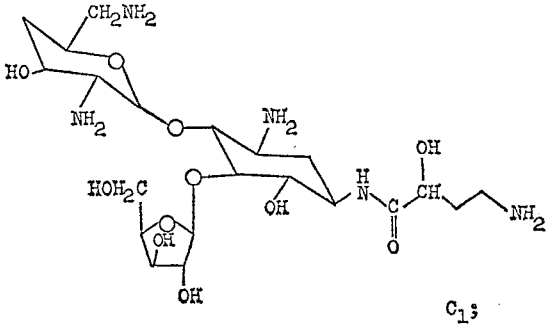

$C_1$;

or a pharmaceutically acceptable acid addition salt thereof.

4. The monosulfate salt of the compound of claim 2.
5. The monosulfate salt of the compound of claim 3.
6. The disulfate salt of the compound of claim 2.
7. The disulfate salt of the compound of claim 3.
8. The mono or polyhydrates of the compounds of claim 1.
9. The mono or polyhydrates of the compound of claim 4.
10. The mono or polyhydrates of the compound of claim 5.
11. The mono or polyhydrate of the compound of claim 6.
12. The mono or polyhydrate of the compound of claim 7.

References Cited

UNITED STATES PATENTS 3,541,078  11/1970  Woo et al. _____ 260—210 AB
3,661,892  5/1972   Shomura et al. ___ 260—210 AB JOHNNIE R. BROWN, Primary Examiner U.S. Cl. X.R.

195—96; 424—181